No. 840,836. PATENTED JAN. 8, 1907.
J. T. FOULKE.
CONVERTIBLE HAND PLOW.
APPLICATION FILED MAR. 5, 1906.
2 SHEETS—SHEET 1.
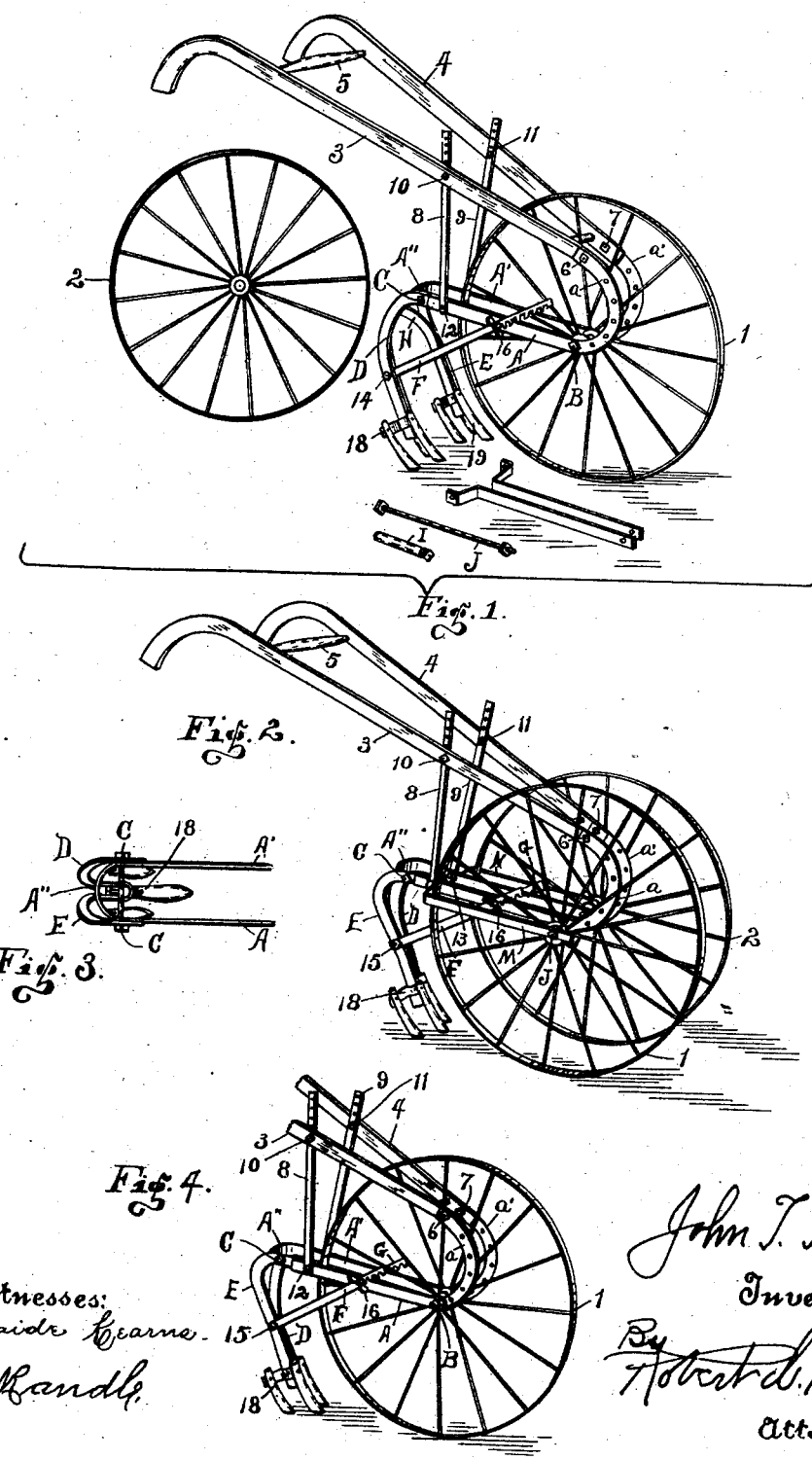

No. 840,836. PATENTED JAN. 8, 1907.
J. T. FOULKE.
CONVERTIBLE HAND PLOW.
APPLICATION FILED MAR. 5, 1906.

2 SHEETS—SHEET 2.

Witnesses:
Adelaide Kearns
R. E. Randle

John T. Foulke
Inventor;
By Robert W. Randle
Attorney.

UNITED STATES PATENT OFFICE.

JOHN T. FOULKE, OF RICHMOND, INDIANA.

CONVERTIBLE HAND-PLOW.

No. 840,836.      Specification of Letters Patent.      Patented Jan. 8, 1907.

Application filed March 5, 1906. Serial No. 304,195.

*To all whom it may concern:*

Be it known that I, JOHN T. FOULKE, a citizen of the United States, residing in Richmond, in the county of Wayne, and in the State of Indiana, have invented certain new and useful Improvements in Convertible Hand-Plows, of which the following is a full, clear, and lucid exposition and specification of my preferred construction, which when taken in connection with the accompanying drawings, forming a part thereof, will be sufficient to enable others to construct and use the same with absolute exactitude.

In this present invention I have produced a convertible plow capable of a great number of changes in order to adapt it for various kinds of work; and my object is to provide a plow of simple construction capable of being quickly and easily changed to meet varying conditions; to provide a plow having self-contained means, whereby it may be transformed from one to the other of several distinct species, thereby combining into one tool the essentials of a plurality thereof.

More particularly stated, my object is to produce in one tool a double-wheel single-sheth plow, a single-wheel double-sheth plow, a double-wheel double-sheth plow, an invertible double-wheel or single-wheel double-sheth or single-sheth plow.

Other objects and advantages will be made manifest in the course of the ensuing specification.

The preferred construction and some of the transformations of my new invention are shown in the accompanying drawings, in which—

Figure 5:
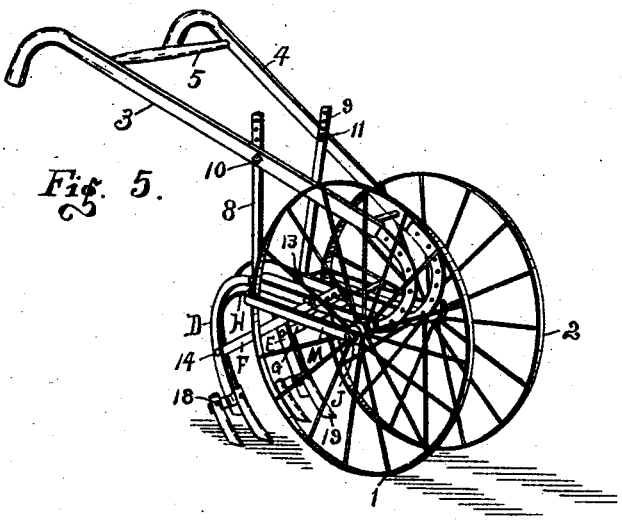
Figure 6:
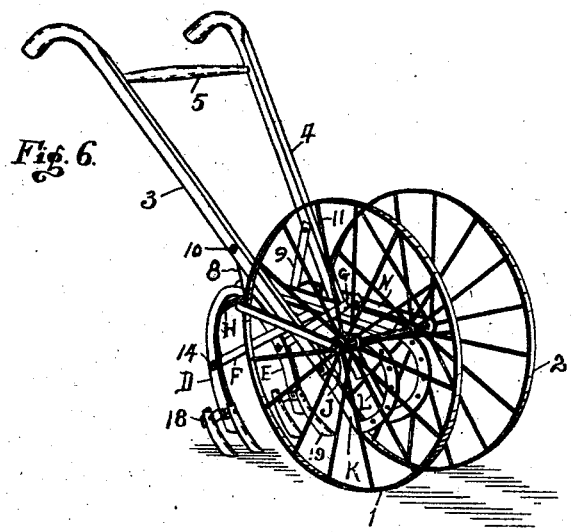
Figure 7:
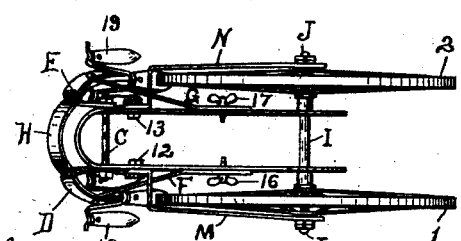

Figure 1 is a perspective view of my invention assembled as a single-wheel double-sheth plow and the parts required to change it to its other forms of transformation. Fig. 2 is a view in perspective of my invention assembled as a double-wheel single-sheth plow. Fig. 3 is a detail top plan view of the essential parts of the plow as assembled in Fig. 2. Fig. 4 is a detail view in perspective of the body of my invention assembled as a single-wheel single-sheth plow. Fig. 5 is a perspective view of my invention assembled as a double-wheel double-sheth plow. Fig. 6 is a perspective view of my invention inverted and assembled as a double-wheel double-sheth plow; and Fig. 7 is a top plan view of my plow assembled as in Fig. 5, the handles being removed.

Similar references characters denote like parts throughout the several views of the drawings.

In the drawings I have shown my plow as assembled in a variety of ways, each view, in fact, showing the same plow, but being differently assembled one from the other, whereby it may be adapted for a variety of uses, and it will be evident that other changes and combinations of the parts may be made.

In this particular exemplification of my invention the letters A and A' designate the two members of the beam, and they are integrally united in the rear by the bowed strut member A'', and said members of the beam have the respective upwardly and backwardly curved arms $a$ and $a'$, as shown, which each have oppositely-disposed apertures therethrough. The said members A and A' are spaced apart and should be formed parallel with each other, as are also the upturned members $a$ and $a'$.

The numerals 1 and 2 denote the ground-wheels, which are identical, being preferably of light metal construction and having each a hub adapted to fit between the members A and A' of the beam.

The numerals 3 and 4 denote forwardly-converging handles connected toward their curved rear ends by the rung 5.

Beginning now with Fig. 1, I have shown the wheel 1 as mounted revolubly between the members A and A' on the short axle-bolt B. The forward ends of the handles 3 and 4 are secured by the respective bolts 6 and 7 to the upturned ends of the members $a$ and $a'$, as shown, and the said handles are adjustably supported by the respective braces 8 and 9, being secured by the respective bolts 10 and 11, and the lower ends of said braces are attached to the respective members of the beam by the bolts 12 and 13. The bolt C extends across horizontally through and between the members A and A' immediately in front of the strut A'', as shown most clearly in Fig. 3. Secured by the bolt C to the outer faces of the members A and A' are the curved sheths D and E, which curve downward and thence forward at the proper predetermined angle, and they also curve outward oppositely from each other, as is indicated in Fig. 7.

The letters F and G designate adjusting-braces, their lower ends being secured near the centers of the respective sheths D and E by the respective bolts 14 and 15 and then project upward and forward at an angle to near the centers of the respective members A and A', to which they are secured by thumb-bolts 16 and 17. The under edges of the upper portions of said braces F and G are notched to fit over the respective thumb-bolts 16 and 17, as shown, whereby the inclination of the sheths may be adjusted.

The letter H denotes a U-shaped yoke which is adapted to connect the sheths D and E, extending over therebetween in the segment of a circle and then extending downward and forward parallel therewith, but spaced slightly therefrom by the interposition of the ends of the braces F and G. The yoke is secured by the bolts 14 and 15, as shown, to the lower ends of the sheths, and their lower ends may also be secured, together with the lower ends of the sheths, to the respective sets of shovels 18 and 19. When assembled as stated above, I have a complete double-sheth single-wheel plow, as shown in Fig. 1.

Desiring now to change from the above to a double-sheth double-wheel plow, I have only to remove the bolt B and the wheel 1, then place the long axle-bolt J in the apertures of the beam in place of the short axle-bolt B, passing it through the thimble I, which thimble extends between the members of the frame to hold them apart when the bolt is tightened, as shown in Figs. 6 and 7. The wheels 1 and 2 are then mounted on the axle-bolt J outside the respective members A and A' of the frame. The letters M and N designate guards which are secured at their forward ends on the outer ends of the axle J outside the respective wheels, and they then extend rearward to a point slightly in the rear of the wheels and then inward to the respective members A and A', where they are secured by the same bolts 12 and 13 by which the respective braces 8 and 9 are sesured at their lower ends. Said guards are adapted to brace and support the outer ends of the axle and prevent plants from contacting with the revolving wheels.

After the above the device may be changed to a single-sheth double-wheel plow, as shown in Fig. 2, as follows: The shovels 18 and 19 are removed. I next remove the yoke H, then remove the sheths D and E and transpose them, whereby their lower portions are brought near together and parallel with each other. I then remove and transpose the braces F and G and secure their lower ends in connection with the sheths D and E by the bolt 15, (or 14,) adjusting said braces at the top, as before, by the thumb-nuts.

In the manner last described the double-shovel single-wheel plow shown in Fig. 1 may be connected to form the single-shovel single-wheel plow, as shown in Fig. 4.

One more transformation will be sufficient to demonstrate the adjustability of my invention, and that is the invention as assembled and shown in Fig. 6, in which the only thing necessary to accomplish this is to invert the beam by turning it over upon the axle without removing the wheel. I then disconnect the sheths, invert them, and secure them as before. I then remove the handles, invert them, extend their lower ends down on either side of the beam, and connect them to the then downward-extending ends of the members of the beam by the interposition of the intermediary plates or bars K and L, (shown only in Fig. 6,) these plates being necessary only to lengthen the handles, as in this position they would be too short if connected directly to the ends $a$ and $a'$, as they are in the other positions.

Various changes and modifications may be made in the construction herein shown and described without departing from the spirit of my invention, the convertibility of my plow being the essential feature thereof.

Therefore what I claim, and desire to secure by Letters Patent of the United States, is—

1. A convertible hand-plow having in combination, a two-member beam united in the rear and having forwardly-upturned ends, handles attached to said upturned ends, a pair of braces for supporting the handles from the beam, means for mounting the ground-wheels, sheths interchangeable with each other extending downward from the rear of each of the members of the beam, a yoke providing means for connecting the sheths, and guards extending from the axle outside the wheels and attached to the beam, all substantially as shown and described and for the purposes set forth.

2. A hand-plow of the character described, having in combination, a two-member beam the members being integrally united in the rear and having forward upturned ends, handles attached to said upturned ends of the beam, braces for supporting the handles and connecting them to the beam, means for mounting ground-wheels to support the forward portion of the beam, removable sheths attached to the rear of the beam, and an inverted-U-shaped yoke for connecting the sheths, all substantially as shown and described and for the purposes set forth.

3. A convertible hand-plow characterized by a two-member beam, the members thereof being united in the rear, an axle carried adjustably by the forward portions of the beam, ground-wheels adapted to be mounted on said axle on either side of and between the members of the beam, sheths extending downward, forward, and inward, from the rear end of said beam, which sheths are adapted to be transposed with reference to each other, an inverted-U-shaped yoke adapted to hold said sheths a predetermined distance apart, and guards extending outside said wheels and connected to the respective members of the beam, all substantially as shown and described.

In testimony whereof I have hereunto signed my name to this specification in the presence of two subscribing witnesses.

JOHN T. FOULKE.

Witnesses:
R. W. RANDLE,
R. E. RANDLE.